March 3, 1964  E. K. SWIFT, JR., ETAL  3,122,875
SPINDLE BRAKES

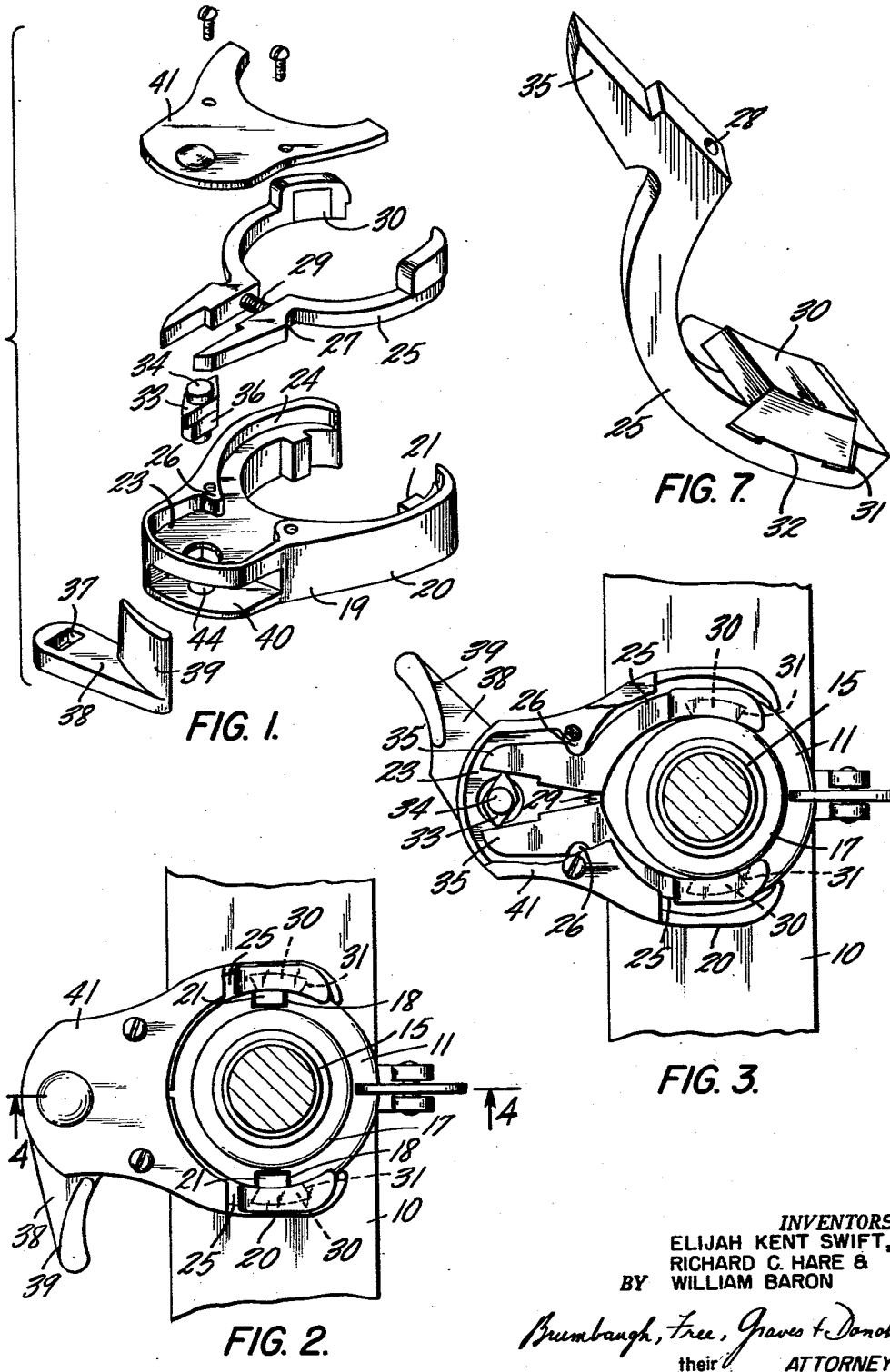

Filed May 9, 1960  2 Sheets-Sheet 2

INVENTORS.
ELIJAH KENT SWIFT, JR.,
RICHARD C. HARE &
BY WILLIAM BARON their ATTORNEYS 3,122,875
SPINDLE BRAKES
Elijah Kent Swift, Jr., and Richard C. Hare, Whitinsville, and William Baron, East Douglas, Mass., assignors to Whitin Machine Works, Whitinsville, Mass., a corporation of Massachusetts
Filed May 9, 1960, Ser. No. 27,596
6 Claims. (Cl. 57—88)

This invention relates to brake mechanism adapted particularly for use with spindles that comprise elements of textile machines such as spinning frames and the like and comprises, more specifically, a spindle brake mechanism that provides a simple and effective manual device for arresting the rotation of a spindle when desired.

During the operation of spinning frames, it occasionally becomes necessary to stop the rotation of a spindle in order to repair a broken end or to accomplish some other operation that may be necessary from time to time. An object of the present invention is to provide a brake mechanism by means of which such rotation of the spindle may be arrested effectively when and as desired and without disturbing the existing structure of the spindle or spindle frame and the related elements by means of which the spindle is mounted upon the frame.

A further object of the invention is to provide a spindle brake of the above character which is manually operated with a simple manipulation and the structure of which is simple to manufacture and assemble, as well as to maintain in a desired condition of repair.

Yet another object of the invention is to provide a spindle brake mechanism of the above character which applies braking forces to the flange of a rotating spindle such that the forces are self-compensating and do not subject the spindle bearing to stresses that are objectionable.

The foregoing and other objects and advantages of this invention will be apparent as the invention is described in connection with the accompanying drawings, wherein:

FIG. 1 is an exploded view showing the components of a spindle brake mechanism constructed in accordance with the present invention, the components being illustrated in perspective views;

FIG. 2 is a plan view of a spindle brake mechanism constructed in accordance with the present invention and mounted in operating position upon the spindle-supporting mechanism of a machine;

FIG. 3 is a view similar to FIG. 2 showing the cover of the housing removed and with the brake arms and brake shoes in their operating position;

FIG. 7 is an enlarged perspective view showing the detail of one of the brake arms that are illustrated in FIG. 1.

Figure 4:
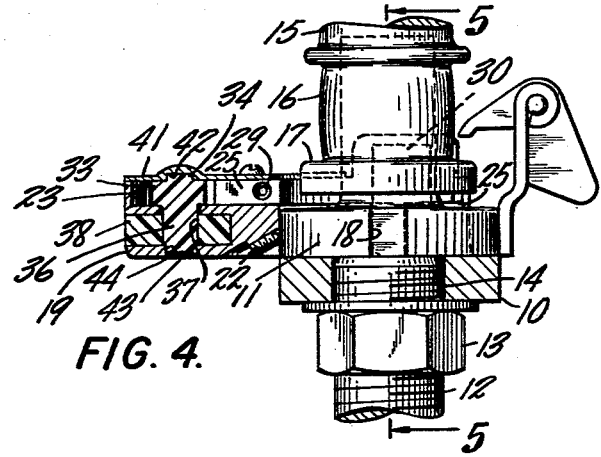
FIG. 4 is a view in elevation, partly in section, on the plane indicated by the line 4—4 of FIG. 2, showing the manner in which the brake housing is secured to the spindle base flange.
Figure 5:
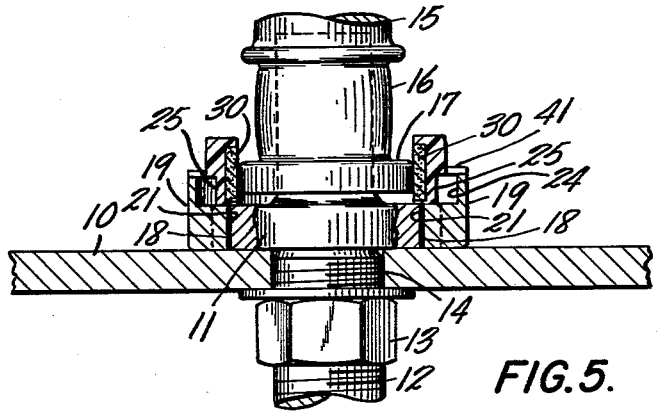
FIG. 5 is a view in section taken on a plane indicated by the line 5—5 of FIG. 4 and looking in the direction of the arrows, this view illustrating the brake pads and brake arms in their braking or operative position.

With reference to the above drawings, the spindle rail of a spinning or twisting machine is illustrated at 10 and, as will be readily understood by those skilled in the art, this rail is adapted to mount a multiplicity of spindles, only one of which will be illustrated herein.

In order that the aforementioned spindles may be mounted on the rail 10, a spindle base 12 having a flange 11 is provided for each spindle, the base being formed with a threaded portion to receive a securing nut 13.

The base 12 is inserted through an aperture 14 in the spindle rail 10 and, in this fashion, the base flange 11 is securely clamped to the spindle rail 10. A spindle 15, journaled in bearings in the base 12 (in accordance with standard practice), and is provided with a whorl 16 having a lower flange 17. Upon opposite sides of the base flange 11, slots 18 are provided in order that they may receive securing lugs presently to be described.

To the foregoing structure, and in accordance with the present invention, there is added brake mechanism comprising a housing 19 having yoke-shaped arms 20 formed with lugs 21 that are adapted to be received within the slots 18. When so positioned, a set screw 22 is tightened (see FIG. 4) and thus the housing is secured to the base flange 11 in the desired position, as illustrated in FIGS. 2 and 3.

The housing 19 is formed with a recess 23 in its upper face and, communicating with this recess, the yoke-shaped arms 20 are provided with cut-away portions 24 to receive a pair of brake arms 25. The sides of the base or housing are formed with ears 26 which form pivot points and which are received within recesses 27 formed in the brake arms 25. The brake arms are also preferably formed with recesses 28 which receive the ends of a coil spring 29 in order to urge the arms apart so that the braking surfaces carried thereby are maintained normally out of contact with the periphery of the lower whorl flange 17. In the preferred form of the spring, at least one of the ends is formed with its end coil enlarged in order to fit snugly into its recess 28, thus locating the spring with facility so that it will not be dislodged. It will be noted from FIG. 3 that the spring 29 is located slightly to one side of an imaginary line joining the pivot points of the ears 26 and is on the side next to the brake shoes. Thus, the spring not only urges the brake shoes apart, but also holds the brake arms in rocker contact on the pivot ears of the housing 19.

At the extremities of the arms, brake pads 30 are provided, the thickness of these pads depending upon the diameter of the whorl flange which is to be engaged thereby. In FIG. 1, for example, relatively thin pads are provided to serve to brake a flange (FIGS. 2 and 3) which is relatively large in diameter. In the form shown in FIG. 7, the brake pad is relatively thick and is designed to be used with a whorl flange that is of less diameter than that shown in FIGS. 2 and 3. In order that the pad may be easily inserted and removed, the ends of the arms 25 are formed with dovetail grooves or recesses 31, the brake pads 30 being formed with complementary configurations in order that they may be slid into position as illustrated in FIG. 7. A bead or slight projection 32 may be formed at the entrance of the grooves 31 in order that the brake pads may be snapped or locked into position.

It will be seen, from the foregoing, that the recesses 27 receive the pivot points or projections 26 in such fashion that the braking forces applied by the arms upon opposite sides of the spindle axis will be substantially equalized inasmuch as, in effect, the braking arms float within the housing. Actuation of the arms into their braking position is accomplished by means of a double cam plate 33, the cam extensions of which lie upon opposite sides of a stud 34, the ends of which are journaled in the casing as will be presently described. The cam plate 33 lies between rearwardly extending arms 35 formed on the brake arms 25, and thus serves to actuate the brake arms as illustrated in FIG. 3. Beneath the cam plate 33 the stud is formed with a squared section 36 which is adapted to be received within an elongated or squared aperture 37, formed in an operating lever 38 having a manually operable handle 39. The lever 38 is received within an elongated slot 40 formed in the rearward extension of the housing 19, and thus operation of the handle 39 serves to actuate or release the brake shoes from their braking position.

A cover plate 41 is provided with a recess 42 within which the upper end of the stud 34 is journaled, the lower end 43 of the stud being received within an aperture 44 formed in the lower wall of the slot 40. In this fashion, the stud 34 is journaled in its operating position so that it may be actuated in the manner above-described.

Figure 6:
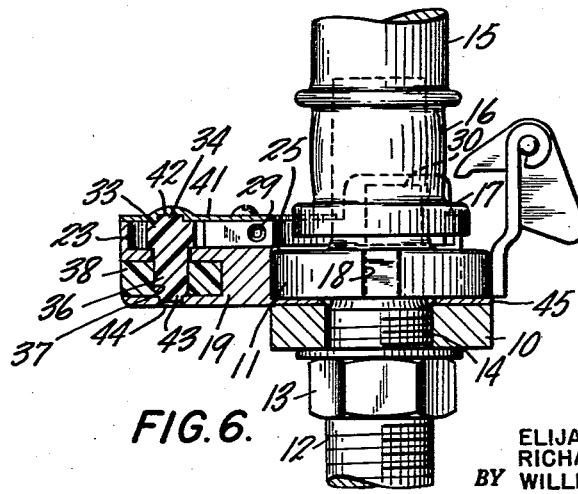
FIG. 6 is a view similar to FIG. 4 showing a slightly modified form of the invention.

In the form of the invention shown in FIG. 6, the housing is provided with a platform 45 which is adapted to be received between the base flange 11 and the rail 10. Adjustment of the spindle thus may be accomplished by inserting shims between the platform 45 and the rail 10 without removing the brake housing.

In the preferred form of the invention, the brake arms 25 are preferably formed in such fashion that they are elastic or resilient and are so diminished that the cam member or plate 33 moves over a dead center position as it moves finally into its brake-operating position. The elasticity or resilience of the arms permits this final movement and thus permits the cam to be maintained in its brake-operating position by the elements of the device itself rather than by the hand of the operator. It has been found, in practice, that this object is attained very effectively by forming the brake arms, as well as the cam member or plate 33, of plastic material.

While the invention has been described with reference to the structures shown in the several modifications of the drawings, it is not to be limited save as defined in the appended claims.

We claim:

1. In a textile spinning frame having at least one spindle, a brake mechanism for said spindle provided with a braking surface comprising a plurality of elongated resilient laterally flexible brake arms carrying brake shoes at corresponding ends, each said arm pivoted intermediate its ends by an external pivot adjacent a surface thereof facing outwardly, means mounting the arms for movement of said shoes toward and away from each other and into braking contact with the braking surface of said spindle when they move toward one another, and means acting upon the other corresponding ends of said arms for positively actuating the arms into brake applying position and holding them in that position, whereby the resiliency of said arms will compensate for wear of the brake shoes on the spindle.

2. In a textile spinning frame having at least one spindle, a spindle brake mechanism comprising a housing formed with a recess and having yoke-shaped arms adapted to embrace said spindle, elongate brake arms within said housing formed of resilient material which are laterally flexible and each received in one of said yoke-shaped arms, projections on said housing external to said brake arms and adjacent a surface thereof facing outwardly between each arm and the housing acting as pivots for said arms, spring means within said housing and disposed between the spindle and the projections urging the arms apart and maintaining said projections and said brake arms in pivotal engagement, and cam means in the housing between the brake arms at the opposite side of the pivots of the brake arms from the spindle to actuate the brake arms against the action of said spring thereby causing braking action of said spindle.

3. In a textile spinning frame having at least one spindle, a brake mechanism for said spindle provided with a braking surface comprising a housing formed with a recess and having yoke-shaped arms for embracing said spindle, a cover for the housing disposed over said recess, brake arms within said recess, each said arm pivoted intermediate its ends to said housing by an external pivot adjacent a surface thereof facing outwardly, cam means positioned between one pair of adjacent ends of said brake arms, spring means urging the other pair of ends of said brake arms in directions to apply said one pair of ends against said cam means, and a lever mounted in the housing and actuating the cam means to positively force said other pair of ends of the brake arms towards each other whereby braking pressure is applied on the braking surface of said spindle.

4. In a textile spinning frame having at least one spindle, a brake mechanism for said spindle provided with a braking surface comprising supporting means, a plurality of elongate brake arms on said supporting means carrying brake shoes at corresponding first ends which face opposite sides of said spindle, a plurality of fulcrum means external to said brake arms and adjacent a surface thereof facing outwardly and positioned intermediate their length, cam actuating means between corresponding second ends of said brake arms for separating said second ends, thereby positively forcing said first ends into brake applying position against said spindle and holding these arms in that position.

5. A brake mechanism as described in claim 4 wherein said fulcrum means comprises two projections extending toward each other at points external to the sides of said brake arms, thereby forming two external pivots.

6. A brake mechanism as described in claim 4 comprising resilient means for pressing said brake arms apart against their respective fulcrum means.

References Cited in the file of this patent

UNITED STATES PATENTS

| | | |
|---|---|---|
| 2,333,047 | Schlums | Oct. 26, 1943 |
| 2,449,773 | Hargreaves et al. | Sept. 21, 1948 |
| 2,566,258 | Sweet | Aug. 28, 1951 |
| 2,800,762 | Wurmli | July 30, 1957 |
| 2,928,230 | Stahlecker | Mar. 15, 1960 |

FOREIGN PATENTS

| | | |
|---|---|---|
| 773,164 | Great Britain | Apr. 24, 1957 |